3,493,603
ADDUCTS OF PHENOLS AND HYDROXYLAMINES

Harry Elmer Albert and Paul Gordon Haines, Lafayette Hill, Pa., assignors to Pennwalt Corporation, a corporation of Pennsylvania
No Drawing. Original application Jan. 25, 1966, Ser. No. 522,850, now Patent No. 3,417,154, dated Dec. 17, 1968. Divided and this application June 6, 1968, Ser. No. 734,864
Int. Cl. C07c 69/76; C07d 87/32, 29/16
U.S. Cl. 260—473  5 Claims This is a divisional of Ser. No. 522,850, now U.S. 3,417,154 filed Jan. 25, 1966.

This invention relates to new compounds which are 1 to 1 molar adducts of a polyhydroxyphenol and a dialkylhydroxylamine. More specifically, the invention is concerned with compounds having the following formula

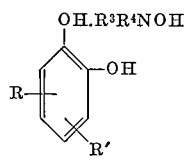

where R is H, OH or a lower alkyl group having 1 to 5 carbon atoms; R' is H, a hydrocarbon group containing 1 to 9 carbon atoms such as methyl, ethyl, t-butyl, amyl, phenyl, benzyl, t-octyl or nonyl, or a carbalkoxy group, $-C(O)OR^2$, where $R^2$ is an alkyl group containing 1 to 5 carbon atoms; $R^3$ and $R^4$ may be the same or different alkyl or substituted alkyl groups containing 1 to 7 carbon atoms such as methyl, ethyl, n-butyl, hydroxyethyl, n-hexyl or benzyl, or $R^3$ and $R^4$ together with the nitrogen atom may form a 5 or 6 membered ring such as in N-hydroxymorpholine, N-hydroxypiperidine, and the like.

The compounds of the invention are liquids, gels or solids, and have utility as monomer stabilizers, as stopping agents for polymerization systems involving ethylenic olefins, and as popcorn polymer inhibitors. The compounds are made easily by gentle warming of the reactants (i.e., the polyhydroxyphenol and the substituted hydroxylamine) to give a homogeneous liquid which generally crystallizes on standing. In carrying out the procedure, generally equimolar amounts of the reactants will be used, but it is found that even when 2 moles of the hydroxylamine compound is used per mole of the polyhydroxyphenol the product obtained is the 1 to 1 adduct. In order to further illustrate the invention, the following examples are given:

EXAMPLE 1.—DIETHYLHYDROXYLAMINE-4-t-BUTYLCATECHOL ADDUCT

Forty-nine and nine-tenths grams (0.30 mole) of 4-tert-butylcatechol (M.P. 38–42° C.) was dissolved in 31.1 g. (0.30 mole) of 86% diethylhydroxylamine by heating to 70°C. during stirring. A viscous brown liquid results which crystallized on standing at room temperature. After pressing on a porous plate, the melting point was found to be 73–75° C. The mixed melting point with purified 4-tert-butylcatechol (M.P. 57–59° C.) was 47–65° C. Analysis gave 5.19% nitrogen; theory for a 1:1 adduct is 5.48% nitrogen. Infrared absorption indicated an adduct structure.

The same product was isolated from a reaction mixture consisting of 2 moles of diethylhydroxylamine per mole of 4-tert-butylcatechol. The product was recrystallized to a constant melting point using hexane as the solvent.

EXAMPLE 2.—DIETHYLHYDROXYLAMINE-CATECHOL ADDUCT

A mixture of 8.9 g. (0.1 mole) of 99.7% diethylhydroxylamine and 11.0 g. (0.1 mole) of catechol (M.P. 104–106° C.) was gently warmed until all the catechol had dissolved. The product was a light yellow liquid at room temperature. Analysis showed it to contain 44.62% diethylhydroxylamine and 7.04% nitrogen. Infrared absorption indicated an adduct structure.

EXAMPLE 3.—DIETHYLHYDROXYLAMINE-3,5-DI-t-BUTYLCATECHOL ADDUCT

A mixture of 4.4 g. (0.02 mole) of 3,5-di-tert-butylcatechol (M.P. 98–100° C.) and 1.8 g. (0.02 mole) of 99.7% diethylhydroxylamine was gently warmed in a beaker to dissolve all of the solid present. The resulting liquid was placed in a vacuum desiccator over anhydrous calcium chloride. After 2 days, a hard gray-colored solid resulted. This melted at 46–49° C. Analysis gave 28.4% diethylhydroxylamine; theory for a 1:1 adduct is 28.6% diethylhydroxylamine. Infrared absorption indicated an adduct structure.

EXAMPLE 4.—DIETHYLHYDROXYLAMINE-PYROGALLOL ADDUCT

A mixture of 3.8 g. (0.03 mole) of pyrogallol (M.P. 133–135° C.) and 5.3 g. (0.06 mole) of 99.7% diethylhydroxylamine was warmed in a beaker on a hot plate until all solids had dissolved. The resulting liquid was placed in a vacuum desiccator over anhydrous calcium chloride. After 1 day, a solid melting at 68–73° C. was obtained. This was pulverized under 200 ml. of n-hexane and filtered to give 5.6 g. of white crystals melting at 72–75° C. Analysis gave 39.6% diethylhydroxylamine; theory for a 1:1 adduct is 41.4% diethylhydroxylamine. The infrared spectrum showed no unchanged starting materials to be present. The same 1:1 adduct was obtained when a 3:1 mole ratio of diethylhydroxylamine to pyrogallol was used.

EXAMPLE 5.—DIETHYLHYDROXYLAMINE-PROPYL GALLATE ADDUCT

A mixture of 20.2 g. (0.1 mole) of propyl gallate (M.P. 146–148° C.) and 8.9 g. (0.1 mole) of 99.7% diethylhydroxylamine was warmed in a beaker on a hot plate to give a homogeneous solution. On cooling, a viscous brown tacky gel was obtained. Infrared absorption showed that there were no starting materials present as such in the reaction product.

Additional examples of compounds which illustrate the invention are as follows:

dimethylhydroxylamine-4-t-butylcatechol
N-hydroxymorpholine-4-t-butylcatechol
diethylhydroxylamine-4-benzycatechol
diethylhydroxylamine-4-phenylcatechol
N-hydroxymorpholine-catechol
di-n-butylhydroxylamine-4-t-butylcatechol
N-hydroxymorpholine-pyrogallol
diethylhydroxylamine-4-t-amylcatechol
N-hydroxymorpholine-4-t-amylcatechol
diethylhydroxylamine-4-methylcatechol
di-n-butylhydroxylamine-pyrogallol
diethylhydroxylamine-5-t-butylpyrogallol
diethylhydroxylamine-3,5-dimethylcatechol
N-hydroxymorpholine-propyl gallate
dimethylhydroxylamine-propyl gallate
N-hydroxypiperidine-propyl gallate As indicated above, the compounds of this invention have been shown to be active as monomer stabilizers, as stopping agents for SBR polymerization, and as popcorn polymer inhibitors.

Evaluation as stabilizers for styrene monomer was carried out using a dilatometer in a manner similar to that described in U.S. Patent 2,965,685. The dilatometer had a bulb approximately 25 ml. capacity and an 80 cm. capillary stem of 2 mm. bore. The dilatometer containing the styrene charge was placed in a constant temperature bath maintained at 120° C. As polymerization progressed, the liquid contracted and the level in the capillary progressively fell. Thus a decrease in the liquid volume in the capillary was a direct measure of the amount of polymerization. The styrene was first distilled to remove the commercial inhibitor and then the test compound was added. A two hour test period at 120° C. was employed to give the following results:

| Compound (0.5% on styrene) | Loss in height (2 hrs. at 120° C.) | |
|---|---|---|
| | Cm. | Percent of blank |
| Blank | 31.3 | 100 |
| Diethylhydroxylamine-t-butylcatechol adduct | 2.4 | 7.6 |
| t-Butylcatechol | 11.0 | 32.2 |

Thus the diethylhydroxylamine-t-butylcatechol adduct is a very effective styrene stabilizer and is considerably more effective than 4-tert-butylcatechol, which is used commercially for styrene stabilization.

Using the same dilatometer under different test conditions, the effectiveness of a stabilizer for acrylonitrile was measured. Freshly distilled acrylonitrile was employed and 0.25% of p-methane hydroperoxide was added immediately before use so that appreciable polymerization would occur in a convenient length of time (2 hours) at 60° C. The test temperature was limited by the boiling point of acrylonitrile (78–79° C.), since having the test temperature too close to the boiling point caused bubble formation in the dilatometer. The following test results were obtained.

| Inhibitor (0.5% on acrylonitrile): | Loss in hgt. (2 hrs. at 60° C.) |
|---|---|
| Blank | 19.0 |
| Diethylhydroxylamine-t-butylcatechol adduct | 0 |

Thus the adduct of diethylhydroxylamine and 4-t-butylcatechol completely inhibited the polymerization of acrylonitrile under these test conditions.

For stopping agent evaluations, a sulfoxylate (SFS) SBR test recipe was employed. For a 7 ounce beverage bottle the following ingredients were used:

| | G. |
|---|---|
| Butadiene | 18 |
| Styrene | 7 |
| Water | 50 |
| Dodecyl mercaptan | 0.058 |
| Rosin acid soap Dresinate 515 | 1.125 |
| Dispersant (Daxad 11) | 0.038 |
| Iron sequesterant (Versene 100) | 0.008 |
| p-Menthane hydroperoxide | 0.011 |
| FeSO$_4$·7H$_2$O | 0.0056 |
| Na$_3$PO$_4$·12H$_2$O | 0.20 |
| Sodium sulfoxylate formaldehyde | 0.0169 |

The loaded bottles were agitated by rotating end-over-end around the shaft of a polymerizer having a bath held at 5° C. Polymerization was allowed to continue until a conversion of 55 to 60% was obtained, the conversion being followed by solids determinations. Then the test stopping agent was injected through the self-sealing bottle cap using a hypodermic syringe. Conversion was again measured after 1 hour at 5° C. and then after 18 hours and 24 hours at 50° C. The following results were obtained:

| | | Percent conversion | | | |
|---|---|---|---|---|---|
| Stopping Agent | Conc (phm.) | When stopped | After 1 hr. at 5° C. | After 18 hrs. at 50° C. | After 24 hrs. at 50° C |
| Series 1: | | | | | |
| None | | 56.6 | | 92.7 | 92.8 |
| Diethylhydroxylamine-t-butylcatechol adduct | 0.15 | 56.6 | 55.3 | 54.5 | 55.2 |
| Series 2: | | | | | |
| None | | 55.6 | | 93.7 | 90.3 |
| Diethylhydroxylamine-catechol adduct | 0.15 | 55.6 | 56.1 | 55.0 | 54.8 |
| Diethylhydroxylamine-propyl gallate adduct | 0.15 | 55.6 | 55.5 | 55.3 | 55.0 |

These results show that the adduct of diethylhydroxylamine and 4-t-butylcatechol, the adduct of diethylhydroxylamine and catechol and the adduct of diethylhydroxylamine and propyl gallate are very effective stopping agents for SBR polymerization.

Evaluation for popcorn polymer inhibition was carried out by test described in U.S. 3,148,225 by charging a 7 ounce beverage bottle with 30 ml. of inhibitor-free styrene, 1 ml. of butadiene, 0.5 g. of popcorn polymer seed and the test inhibitor. The bottles thus prepared, including a blank, were then heated in an air oven at 140° F. while being checked frequently for growth of popcorn polymer. Using this procedure, the following results were obtained.

Compound: Result (at 140° F.)

No inhibitor _____ Popped after 12 hours.
0.05% diethylhydroxyla-
  mine - t - butylcatechol ad-
  duct _____ Popped after 50 days.

These results show that the diethylhydroxylamine-t-butylcatechol adduct is an extremely effective inhibitor of popcorn polymer formation.

In a second test series, the following results were obtained.

Compound: Result (at 140° F.)

No inhibitor _____ Popped after 12 hours.
0.05% diethylhydroxyla-
  minecatechol adduct ____ Popcorn growth started
                             after 15 days—very
                             little further growth
                             after 31 days.

0.05% diethylhydroxyla-
  minepropyl gallate ad-
  duct _____ Popped after 14 days.

These results show that the adducts of the invention are very effective inhibitors of popcorn polymer formation.

It will be understood that the aducts of the invention may be used generally to prevent popcorn polymers in the preparation of polymers and copolymers such as those obtained from ethylenically unsaturated monomers. For homopolymers, the unsaturated monomer will be a conjugated diolefin. The useful conjugated diolefins are exemplified by butadienes such as butadiene-1,3, isoprenene, cyanobutadiene-1,3, chloroprene, 2-phenyl-butadiene, 2,3-dimethylbutadiene-1,3, and the like. The copolymerizable monomer used in copolymer formation and which will normally comprise up to about 70% of the mixture will be a mono-olefin containing a single CH$_2$=CH— group having at least one of the free valence bonds attached to an electronegative group. Such olefins include aromatic olefins such as styrene, vinylnaphthalene, α-methylstyrene, p-chlorostyrene, etc.; the carboxy containing monomers and the corresponding esters, nitriles, and amides such as acrylic acid, methacrylic acid, methylmethacrylate, acrylonitrile, methacrylamide, and the like. Preferably, this invention will be used in recovering the monomers used to make any butadiene-based polymer latex.

The concentration at which the inhibitor is used will usually range from 0.001 to about 5.0 percent by weight of the total monomers (i.e., about 10 to 50,000 parts per million parts of monomer). At concentrations below this value the inhibiting effects are too small to be of significant value. On the other hand, greater amounts may be used, say up to 20%, but such large amounts are not required and are simply wasteful of inhibitor.

It will be understood that numerous changes and variations may be made from the above description and examples without departing from the spirit and scope of the invention.

We claim:
1. An adduct of a polyhydroxyphenol and a dialkylhydroxylamine which is a compound having the structure

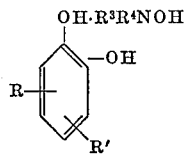

where R is selected from the group consisting of hydrogen, hydroxyl, and lower alkyl having from one to five carbon atoms, R' is selected from the group consisting of hydrogen, a hydrocarbon group containing one to nine carbon atoms, and —COOR² where R² is an alkyl group containing from one to five carbon atoms, R³ and R⁴ are the same or different alkyl or hydroxyalkyl groups containing from one to seven carbon atoms or benzyl and which may together with the nitrogen atom form a morpholine or piperidine ring.

2. An adduct as in claim 1 of diethylhydroxylamine and catechol.

3. An adduct as in claim 1 of diethylhydroxylamine and 3,5-di-tertiary butyl catechol.

4. An adduct as in claim 1 of diethylhydroxylamine and pyrogallol.

5. An adduct as in claim 1 of diethylhydroxylamine and propyl gallate.

References Cited
UNITED STATES PATENTS 3,417,154  12/1968  Albert et al. _____ 260—473 X
1,976,921  10/1934  Christiansen et al. __ 260—473 X LORRAINE A. WEINBERGER, Primary Examiner D. STENZEL, Assistant Examiner U.S. Cl. X.R.

260—247.2, 247.7, 294.3, 294.7, 567.5